United States Patent
Sugawara et al.

(10) Patent No.: US 12,255,288 B2
(45) Date of Patent: Mar. 18, 2025

(54) NONAQUEOUS ELECTROLYTIC SOLUTION FOR BATTERY AND LITHIUM SECONDARY BATTERY

(71) Applicant: MITSUI CHEMICALS, INC., Tokyo (JP)

(72) Inventors: Kei Sugawara, Ichihara (JP); Satoko Fujiyama, Kisarazu (JP)

(73) Assignee: MITSUI CHEMICALS, INC., Tokyo (JP)

( * ) Notice: Subject to any disclaimer, the term of this patent is extended or adjusted under 35 U.S.C. 154(b) by 420 days.

(21) Appl. No.: 17/599,295

(22) PCT Filed: Mar. 18, 2020

(86) PCT No.: PCT/JP2020/012118
§ 371 (c)(1),
(2) Date: Sep. 28, 2021

(87) PCT Pub. No.: WO2020/203322
PCT Pub. Date: Oct. 8, 2020

(65) Prior Publication Data
US 2022/0158247 A1    May 19, 2022

(30) Foreign Application Priority Data

Mar. 29, 2019 (JP) ................. 2019-066772

(51) Int. Cl.
*H01M 10/0568* (2010.01)
*H01M 4/583* (2010.01)
(Continued)

(52) U.S. Cl.
CPC ....... *H01M 10/0568* (2013.01); *H01M 4/583* (2013.01); *H01M 10/0525* (2013.01);
(Continued)

(58) Field of Classification Search
CPC ........... H01M 10/0567; H01M 10/568; H01M 10/569; H01M 4/583
(Continued)

(56) References Cited

U.S. PATENT DOCUMENTS

2012/0219866 A1*   8/2012   Onuki ................ H01M 10/056
                                                                    429/200
2012/0308881 A1   12/2012   Tokuda et al.
(Continued)

FOREIGN PATENT DOCUMENTS

CN        105470575 B    2/2018
JP        2003-132946 A  5/2003
(Continued)

*Primary Examiner* — James M Erwin
(74) *Attorney, Agent, or Firm* — BUCHANAN, INGERSOLL & ROONEY PC

(57) ABSTRACT

A nonaqueous electrolytic solution for a battery that includes a negative electrode active material containing graphite, the nonaqueous electrolytic solution for a battery containing a compound represented by the following Formula (1): in Formula (1), R represents a fluorine atom or a fluorinated hydrocarbon group having from 1 to 6 carbon atoms.

(1)

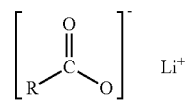

4 Claims, 3 Drawing Sheets

(51) Int. Cl.
*H01M 10/0525* (2010.01)
*H01M 10/0567* (2010.01)
*H01M 10/0569* (2010.01)

(52) U.S. Cl.
CPC ... *H01M 10/0567* (2013.01); *H01M 10/0569* (2013.01); *H01M 2300/0028* (2013.01)

(58) Field of Classification Search
USPC .......................................................... 429/322
See application file for complete search history.

(56) References Cited

U.S. PATENT DOCUMENTS

| | | | |
|---|---|---|---|
| 2014/0030588 A1* | 1/2014 | Hong | H01M 4/131 |
| | | | 429/188 |
| 2018/0048017 A1 | 2/2018 | Jilek et al. | |
| 2019/0006713 A1* | 1/2019 | Takahashi | H01M 4/66 |

FOREIGN PATENT DOCUMENTS

| | | | |
|---|---|---|---|
| JP | 2004022379 A | 1/2004 |
| JP | 2008305771 A | 12/2008 |
| JP | 2010092698 A | 4/2010 |
| JP | 2010238504 A | 10/2010 |
| JP | 2012195223 A | 10/2012 |
| JP | 2013246992 A | 12/2013 |
| JP | 2015149234 A | 8/2015 |
| JP | 2016029668 A | 3/2016 |
| JP | 2017091943 A | 5/2017 |

\* cited by examiner

NONAQUEOUS ELECTROLYTIC SOLUTION FOR BATTERY AND LITHIUM SECONDARY BATTERY

TECHNICAL FIELD

The present disclosure relates to a nonaqueous electrolytic solution for a battery and a lithium secondary battery.

BACKGROUND ART

Conventionally, various studies have been made on nonaqueous electrolytic solutions for batteries used in batteries such as a lithium secondary battery.

For example, Patent Document 1 discloses "a nonaqueous electrolytic solution for use in a lithium ion secondary battery, the nonaqueous electrolytic solution being obtained by dissolving a lithium-containing electrolyte salt in a nonaqueous solvent, the nonaqueous electrolytic solution further containing a lithium salt having an oxalate complex as an anion, and an acid anhydride containing a fluorine atom and/or a lithium salt of a carboxylic acid or a sulfonic acid containing a fluorine atom".

In addition, Patent Document 2 discloses "an electrolytic solution for a secondary battery including an organic solvent and an electrolyte (excluding lithium difluoroacetate), the electrolytic solution further including lithium difluoroacetate".

Patent Document 1: Japanese Patent Application Laid-Open (JP-A) No. 2010-238504

Patent Document 2: Japanese Patent Application Laid-Open (JP-A) No. 2004-22379

SUMMARY OF INVENTION

Technical Problem

However, it may be required to further reduce the initial battery resistance of the battery.

An object of one aspect of the present disclosure is to provide a nonaqueous electrolytic solution for a battery capable of reducing initial battery resistance of the battery.

An object of another aspect of the disclosure is to provide a lithium secondary battery having reduced initial battery resistance.

Solution to Problem

Means for solving the problems include the following aspects.

<1> A nonaqueous electrolytic solution for a battery that includes a negative electrode active material containing graphite, the nonaqueous electrolytic solution for a battery containing:

a compound represented by the following Formula (1).

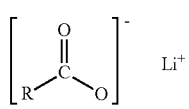

(1)

In Formula (1), R represents a fluorine atom or a fluorinated hydrocarbon group having from 1 to 6 carbon atoms.

<2> The nonaqueous electrolytic solution for a battery according to <1>, wherein a content of the compound represented by Formula (1) is 0.001% by mass to 10% by mass with respect to a total amount of the nonaqueous electrolytic solution.

<3> The nonaqueous electrolytic solution for a battery according to <1> or <2>, further comprising a sulfur-containing compound.

<4> The nonaqueous electrolytic solution for a battery according to <3>, wherein the sulfur-containing compound is at least one selected from the group consisting of a disulfonyl compound, a sulfonic acid ester, a sulfuric acid ester, a sulfobenzoic acid compound, a bissulfonylimide compound, a sulfonate, and a sulfate.

<5> The nonaqueous electrolytic solution for a battery according to <3> or <4>, wherein a content of the sulfur-containing compound is 0.001% by mass to 10% by mass with respect to a total amount of the nonaqueous electrolytic solution.

<6> The nonaqueous electrolytic solution for a battery according to <1> or <2>, further comprising a compound represented by the following Formula (A).

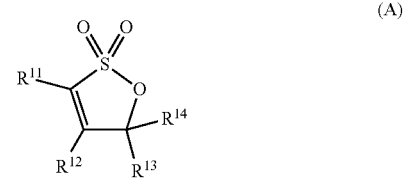

(A)

In Formula (A), each of $R^{11}$ to $R^{14}$ independently represents a hydrogen atom, a fluorine atom, a hydrocarbon group having from 1 to 3 carbon atoms, or a fluorinated hydrocarbon group having from 1 to 3 carbon atoms.

<7> The nonaqueous electrolytic solution for a battery according to <6>, wherein a content of the compound represented by Formula (A) is 0.001% by mass to 10% by mass with respect to a total amount of the nonaqueous electrolytic solution.

<8> A lithium secondary battery including:

a positive electrode;

a negative electrode including a negative electrode active material containing graphite; and the nonaqueous electrolytic solution for a battery according to any one of <1> to <7>.

<9> A lithium secondary battery obtained by charging and discharging the lithium secondary battery according to <8>.

Advantageous Effects of Invention

According to one aspect of the disclosure, provided is a nonaqueous electrolytic solution for a battery capable of reducing initial battery resistance of the battery.

According to another aspect of the disclosure, provided is a lithium secondary battery having reduced initial battery resistance.

DESCRIPTION OF EMBODIMENTS

Figure 1:
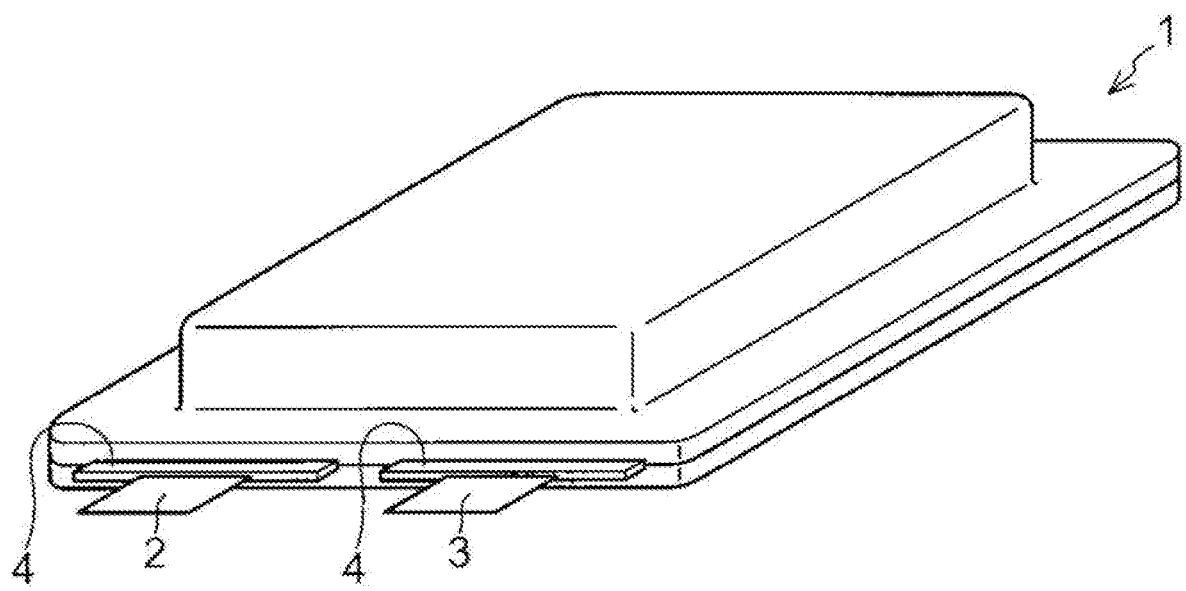
FIG. 1 is a schematic perspective view showing an example of a laminate type battery which is an example of a lithium secondary battery of the present disclosure.

In the present specification, a numerical range represented using "to" means a range including numerical values described before and after "to" as a lower limit value and an upper limit value.

In the present specification, in a case in which there are a plurality of substances corresponding to each component in the composition, the amount of each component in the composition means the total amount of a plurality of the substances present in the composition unless otherwise specified.

[Nonaqueous Electrolytic Solution for Battery]

The nonaqueous electrolytic solution (hereinafter, also simply referred to as "nonaqueous electrolytic solution") for a battery of the present disclosure is a nonaqueous electrolytic solution used in a battery that includes a negative electrode active material containing graphite, and contains a compound represented by the following Formula (1).

According to the nonaqueous electrolytic solution of the disclosure, in a battery used in a battery that includes a negative electrode active material containing graphite, initial battery resistance can be reduced.

The reason why such an effect is exhibited is not clear, but is presumed as follows.

The nonaqueous electrolytic solution of the disclosure contains lithium acetate. As a result, it is considered that the lithium acetate forms a film on a negative electrode, and a lithium ion deinsertion property is improved. As a result, an increase in initial battery resistance is suppressed.

<Compound Represented by Formula (1)>

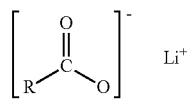
(1)

In Formula (1), R represents a fluorine atom or a fluorinated hydrocarbon group having from 1 to 6 carbon atoms.

In Formula (1), R is preferably a fluorine atom or a fluorinated hydrocarbon group having from 1 to 3 carbon atoms, more preferably a fluorine atom or a fluorinated hydrocarbon group having from 1 to 2 carbon atoms, and still more preferably a fluorinated hydrocarbon group having 1 carbon atom.

Hereinafter, specific examples of the compound represented by Formula (1) are shown, and the compound represented by Formula (1) is not limited to the following specific examples.

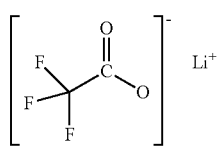
(1-1)

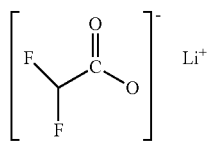
(1-2)

The content of the compound represented by Formula (1) is preferably from 0.001% by mass to 10% by mass, more preferably from 0.01% by mass to 5% by mass, still more preferably from 0.1% by mass to 2% by mass, and still more preferably from 0.1% by mass to 0.6% by mass with respect to the total amount of the nonaqueous electrolytic solution.

<Sulfur-Containing Compound>

The nonaqueous electrolytic solution of the disclosure preferably contains a sulfur-containing compound (that is, a compound containing a sulfur atom). Examples of the sulfur-containing compound include at least one kind selected from the group consisting of a disulfonyl compound, a sulfonic acid ester, a sulfuric acid ester, a sulfobenzoic acid compound, a bissulfonylimide compound, a sulfonate, and a sulfate.

As the sulfonic acid ester, a cyclic sulfonic acid ester is preferable, and a compound represented by Formula (A) described later is more preferable.

As the bissulfonylimide compound, a compound represented by Formula (B) described later is preferable.

As the sulfuric acid ester, a cyclic sulfuric acid ester is preferable, and a compound represented by Formula (C) described later is more preferable.

As the disulfonyl compound, a cyclic disulfonyl compound (that is, a compound having a cyclic structure having two sulfonyl groups) is preferable, and a compound represented by Formula (D) described later is more preferable.

As the sulfobenzoic acid compound, a compound represented by Formula (E) described later is preferable.

As the sulfonate, a compound represented by Formula (F) described later is preferable.

In a case in which the nonaqueous electrolytic solution of the disclosure contains a sulfur-containing compound, the content of the sulfur-containing compound with respect to the total amount of the nonaqueous electrolytic solution is preferably from 0.001% by mass to 10% by mass, more preferably from 0.005% by mass to 5% by mass, still more preferably from 0.01% by mass to 5% by mass, and particularly preferably from 0.1% by mass to 3% by mass.

In a case in which the nonaqueous electrolytic solution of the disclosure contains a sulfur-containing compound, the ratio of the contained mass of the sulfur-containing compound with respect to the contained mass of the compound represented by Formula (1) (hereinafter, also referred to as "content mass ratio [sulfur-containing compound/compound represented by Formula (1)]") is preferably from 0.3 to 30, and more preferably from 1 to 20.

Specific examples of the sulfur-containing compound include at least one kind selected from the group consisting of compounds represented by Formula (A) to Formula (F) described later. Hereinafter, the compounds represented by Formula (A) to Formula (F) is described in detail.

<Compound Represented by Formula (A)>

The nonaqueous electrolytic solution of the disclosure may contain a compound represented by the following Formula (A). The compound represented by Formula (A) is included in the sulfonic acid ester.

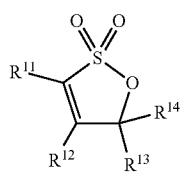
(A)

In Formula (A), each of $R^{11}$ to $R^{14}$ independently represents a hydrogen atom, a fluorine atom, a hydrocarbon group having from 1 to 3 carbon atoms, or a fluorinated hydrocarbon group having from 1 to 3 carbon atoms.

In Formula (A), the hydrocarbon group having from 1 to 3 carbon atoms represented by $R^{11}$ to $R^{14}$ is preferably an alkyl group, an alkenyl group, or an alkynyl group, more preferably an alkyl group or an alkenyl group, and particularly preferably an alkyl group.

In Formula (A), the number of carbon atoms of the hydrocarbon group having from 1 to 3 carbon atoms represented by $R^{11}$ to $R^{14}$ is preferably 1 or 2, and particularly preferably 1.

In Formula (A), the fluorinated hydrocarbon group having from 1 to 3 carbon atoms represented by $R^{11}$ to $R^{14}$ is preferably a fluorinated alkyl group, a fluorinated alkenyl group, or a fluorinated alkynyl group, more preferably a fluorinated alkyl group or a fluorinated alkenyl group, and particularly preferably a fluorinated alkyl group.

In Formula (A), the number of carbon atoms of the fluorinated hydrocarbon group having from 1 to 3 carbon atoms represented by $R^{11}$ to $R^{14}$ is preferably 1 or 2, and particularly preferably 1.

In Formula (A), each of $R^{11}$ to $R^{14}$ is independently preferably a hydrogen atom, a fluorine atom, a methyl group, an ethyl group, a trifluoromethyl group, or a pentafluoroethyl group, is more preferably a hydrogen atom or a methyl group, and is particularly preferably a hydrogen atom.

Specific examples of the compound represented by Formula (A) include compounds represented by the following Formula (A-1) to the following Formula (A-21) (Hereinafter, the compounds are also referred to as compounds (A-1) to (A-21), respectively.), and the compound represented by Formula (A) is not limited to these specific examples.

Among these, the compound (A-1) (that is, 1,3-propene-sultone; hereinafter, also referred to as "PRS") is particularly preferable.

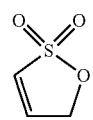
(A-1)

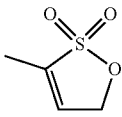
(A-2)

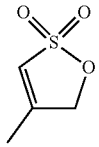
(A-3)

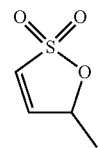
(A-4)

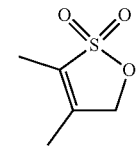
(A-5)

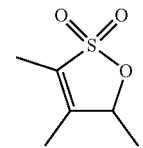
(A-6)

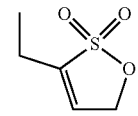
(A-7)

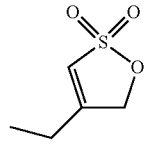
(A-8)

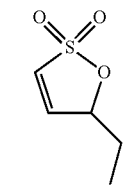
(A-9)

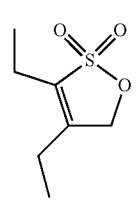
(A-10)

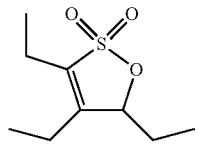
(A-11)

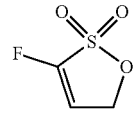
(A-12)

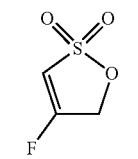
(A-13)

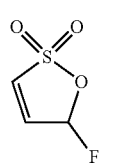
(A-14)

(A-15)

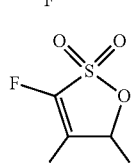
(A-16)

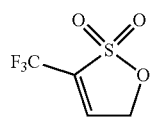
(A-17)

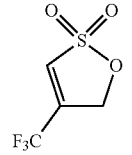
(A-18)

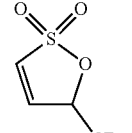
(A-19)

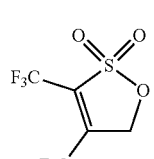
(A-20)

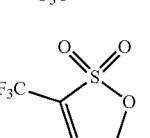
(A-21)

In a case in which the nonaqueous electrolytic solution of the disclosure contains the compound represented by Formula (A), the content of the compound represented by Formula (A) with respect to the total amount of the nonaqueous electrolytic solution is preferably from 0.001% by mass to 10% by mass, more preferably from 0.005% by mass to 5% by mass, still more preferably from 0.01% by mass to 5% by mass, and particularly preferably from 0.1% by mass to 3% by mass.

In a case in which the nonaqueous electrolytic solution of the disclosure contains the compound represented by Formula (A), the ratio of the contained mass of the compound represented by Formula (A) with respect to the contained mass of the compound represented by Formula (1) (hereinafter, also referred to as "content mass ratio [compound represented by Formula (A)/compound represented by Formula (1)]") is preferably from 0.3 to 30 and more preferably from 1 to 20.

<Compound Represented by Formula (B)>

The nonaqueous electrolytic solution of the disclosure may contain a compound represented by the following Formula (B). The compound represented by Formula (B) is included in the bissulfonylimide compound.

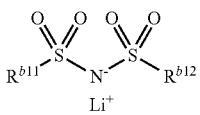
(B)

In Formula (B), each of $R^{b11}$ and $R^{b12}$ independently preferably represents a fluorine atom, a trifluoromethyl group, or a pentafluoroethyl group, and is more preferably a fluorine atom or a trifluoromethyl group.

Examples of the compound represented by Formula (B) include lithiumbis(fluorosulfonyl)imide, lithiumbis(trifluoromethylsulfonyl)imide, and lithiumbis(pentafluoroethylsulfonyl)imide.

Lithiumbis(fluoromethylsulfonyl)imide (abbreviation: LiFSI) is a compound (Hereinafter, it is also referred to as "compound (B-1)".) in which both $R^{b11}$ and $R^{b12}$ are a fluorine atom in Formula (B).

Lithiumbis(trifluoromethylsulfonyl)imide (abbreviation: LiTFSI) is a compound (Hereinafter, it is also referred to as "compound (B-2)".) in which both $R^{b11}$ and $R^{b12}$ are a trifluoromethyl group in Formula (B).

In a case in which the nonaqueous electrolytic solution of the disclosure contains the compound represented by Formula (B), the content of the compound represented by Formula (B) with respect to the total amount of the nonaqueous electrolytic solution is preferably from 0.001% by mass to 10% by mass, more preferably from 0.005% by mass to 5% by mass, still more preferably from 0.01% by mass to 5% by mass, and particularly preferably from 0.1% by mass to 3% by mass.

In a case in which the nonaqueous electrolytic solution of the disclosure contains the compound represented by Formula (B), the ratio of the contained mass of the compound represented by Formula (B) with respect to the contained mass of the compound represented by Formula (1) (hereinafter, also referred to as "content mass ratio [compound represented by Formula (B)/compound represented by Formula (1)]") is preferably from 0.3 to 30 and more preferably from 1 to 20.

<Compound Represented by Formula (C)>

The nonaqueous electrolytic solution of the disclosure may contain a compound represented by the following Formula (C). The compound represented by Formula (C) is included in the sulfuric acid ester.

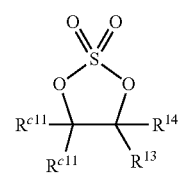
(C)

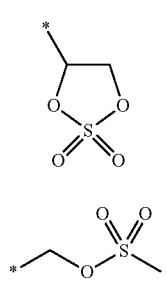

(a)

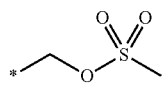

(b)

In Formula (C), each of $R^{c11}$ to $R^{c14}$ independently represents a hydrogen atom, a hydrocarbon group having from 1 to 6 carbon atoms, a group represented by Formula (a), or a group represented by Formula (b). In Formula (a) and Formula (b), * represents a bonding position.

In Formula (C), the hydrocarbon group having from 1 to 6 carbon atoms represented by $R^{c11}$ to $R^{c14}$ is preferably an alkyl group, an alkenyl group, or an alkynyl group, more preferably an alkyl group or an alkenyl group, and particularly preferably an alkyl group.

In Formula (C), the number of carbon atoms of the hydrocarbon group having from 1 to 6 carbon atoms represented by $R^{c11}$ to $R^{c14}$ is preferably 1 or 2, and particularly preferably 1.

Specific examples of the compound represented by Formula (C) include compounds represented by the following Formula (C-1) to the following Formula (C-6) (Hereinafter, the compounds are also referred to as compounds (C-1) to (C-6), respectively.), and the compound represented by Formula (C) is not limited to these specific examples.

Among these, the compounds (C-1) to (C-3) are particularly preferable.

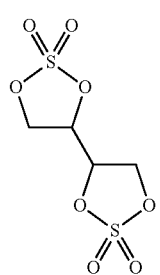

(C-1)

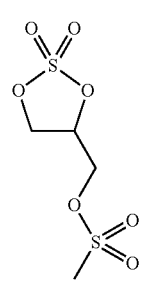

(C-2)

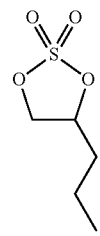

(C-3)

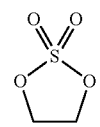

(C-4)

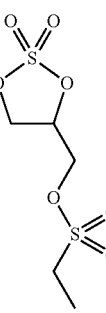

(C-5)

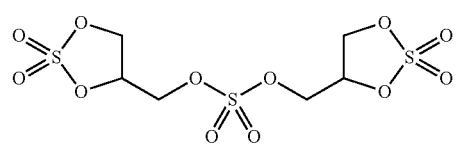

(C-6)

In a case in which the nonaqueous electrolytic solution of the disclosure contains the compound represented by Formula (C), the content of the compound represented by Formula (C) with respect to the total amount of the nonaqueous electrolytic solution is preferably from 0.001% by mass to 10% by mass, more preferably from 0.005% by mass to 5% by mass, still more preferably from 0.01% by mass to 5% by mass, and particularly preferably from 0.1% by mass to 3% by mass.

In a case in which the nonaqueous electrolytic solution of the disclosure contains the compound represented by Formula (C), the ratio of the contained mass of the compound represented by Formula (C) with respect to the contained mass of the compound represented by Formula (1) (hereinafter, also referred to as "content mass ratio [compound represented by Formula (C)/compound represented by Formula (1)]") is preferably from 0.3 to 30 and more preferably from 1 to 20.

<Compound Represented by Formula (D)>

The nonaqueous electrolytic solution of the disclosure preferably contains a compound represented by the following Formula (D). The compound represented by Formula (D) is included in the disulfonyl compound.

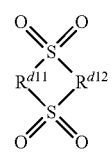

(D)

In Formula (D), each of $R^{d11}$ and $R^{d12}$ is independently a divalent hydrocarbon group having from 1 to 10 carbon atoms.

Examples of the divalent hydrocarbon group having from 1 to 10 carbon atoms represented by $R^{d11}$ and $R^{d12}$ in Formula (D) include one kind of group selected from a group X consisting of an alkylene group, an alkenylene group, an alkynylene group, and an arylene group, and a group formed by bonding two or more kinds selected from the group X.

In Formula (D), the divalent hydrocarbon group having from 1 to 10 carbon atoms represented by $R^{d11}$ and $R^{d12}$ is preferably an alkylene group, more preferably a methylene group substituted with an alkyl group, and still more preferably a group represented by —CHR— (wherein R is an alkyl group having from 1 to 9 carbon atoms).

In Formula (D), the number of carbon atoms of the divalent hydrocarbon group having from 1 to 10 carbon atoms represented by $R^{d11}$ and $R^{d12}$ is preferably from 1 to 6.

Specific examples of the compound represented by Formula (D) include compounds represented by the following Formula (D-1) to the following Formula (D-2) (Hereinafter, the compounds are also referred to as compounds (D-1) to (D-2), respectively.), and the compound represented by Formula (D) is not limited to these specific examples.

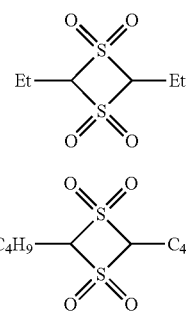

Et in the compound (D-1) represents an ethyl group.

In a case in which the nonaqueous electrolytic solution of the disclosure contains the compound represented by Formula (D), the content of the compound represented by Formula (D) with respect to the total amount of the nonaqueous electrolytic solution is preferably from 0.001% by mass to 10% by mass, more preferably from 0.005% by mass to 5% by mass, still more preferably from 0.01% by mass to 5% by mass, and particularly preferably from 0.1% by mass to 3% by mass.

In a case in which the nonaqueous electrolytic solution of the disclosure contains the compound represented by Formula (D), the ratio of the contained mass of the compound represented by Formula (D) with respect to the contained mass of the compound represented by Formula (1) (hereinafter, also referred to as "content mass ratio [compound represented by Formula (D)/compound represented by Formula (1)]") is preferably from 0.3 to 30 and more preferably from 1 to 20.

<Compound Represented by Formula (E)>

The nonaqueous electrolytic solution of the disclosure may contain a compound represented by the following Formula (E). The compound represented by Formula (E) is included in the sulfobenzoic acid compound.

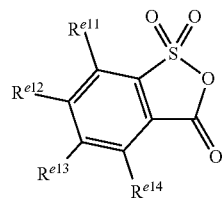

In Formula (E), each of $R^{e11}$ to $R^{e14}$ independently represents a hydrogen atom, a halogen atom, a hydrocarbon group having from 1 to 6 carbon atoms, a halogenated hydrocarbon group having from 1 to 6 carbon atoms, a hydrocarbon-oxy group having from 1 to 6 carbon atoms, or a halogenated hydrocarbon-oxy group having from 1 to 6 carbon atoms.

In Formula (E), the halogen atom is preferably a fluorine atom, a chlorine atom, a bromine atom, or an iodine atom, more preferably a fluorine atom, a chlorine atom, or a bromine atom, still more preferably a fluorine atom or a chlorine atom, and still more preferably a fluorine atom.

In Formula (E), the hydrocarbon group having from 1 to 6 carbon atoms represented by $R^{e11}$ to $R^{e14}$ may be a linear hydrocarbon group or a hydrocarbon group having a branched and/or cyclic structure.

In Formula (E), a specific example of the hydrocarbon group having from 1 to 6 carbon atoms represented by $R^{e11}$ to $R^{e14}$ is preferably a hydrocarbon group having from 1 to 6 carbon atoms (that is, an unsubstituted hydrocarbon group having from 1 to 6 carbon atoms), and particularly preferably an alkyl group having from 1 to 6 carbon atoms.

In Formula (E), the hydrocarbon group having from 1 to 6 carbon atoms represented by $R^{e11}$ to $R^{e14}$ is preferably an alkyl group, an alkenyl group, or an alkynyl group, more preferably an alkyl group or an alkenyl group, and particularly preferably an alkyl group.

In Formula (E), the number of carbon atoms of the hydrocarbon group having from 1 to 6 carbon atoms represented by $R^{e11}$ to $R^{e14}$ is preferably from 1 to 3, more preferably 1 or 2, and still more preferably 1.

In Formula (E), the halogenated hydrocarbon group having from 1 to 6 carbon atoms represented by $R^{e11}$ to $R^{e14}$ means a hydrocarbon group having from 1 to 6 carbon atoms substituted with at least one halogen atom.

The halogen atom in the halogenated hydrocarbon group is preferably a fluorine atom, a chlorine atom, a bromine atom, or an iodine atom, more preferably a fluorine atom, a chlorine atom, or a bromine atom, still more preferably a fluorine atom or a chlorine atom, and still more preferably a fluorine atom.

In Formula (E), the halogenated hydrocarbon group having from 1 to 6 carbon atoms represented by $R^{e11}$ to $R^{e14}$ may be a linear halogenated hydrocarbon group or a halogenated hydrocarbon group having a branched and/or cyclic structure.

In Formula (E), the halogenated hydrocarbon group having from 1 to 6 carbon atoms represented by $R^{e11}$ to $R^{e14}$ is preferably a halogenated alkyl group, a halogenated alkenyl group, or a halogenated alkynyl group, more preferably a halogenated alkyl group or a halogenated alkenyl group, and particularly preferably a halogenated alkyl group.

In Formula (E), the number of carbon atoms of the halogenated hydrocarbon group having from 1 to 6 carbon atoms represented by $R^{e11}$ to $R^{e14}$ is preferably from 1 to 3, more preferably 1 or 2, and still more preferably 1.

In Formula (E), the hydrocarbon-oxy group having from 1 to 6 carbon atoms represented by $R^{e11}$ to $R^{e14}$ may be a linear hydrocarbon-oxy group or a hydrocarbon-oxy group having a branched and/or cyclic structure.

In Formula (E), the hydrocarbon-oxy group having from 1 to 6 carbon atoms represented by $R^{e11}$ to $R^{e14}$ is preferably an alkoxy group, an alkenyloxy group, or an alkynyloxy group, more preferably an alkoxy group or an alkenyloxy group, and particularly preferably an alkoxy group.

In Formula (E), the number of carbon atoms of the hydrocarbon-oxy group having from 1 to 6 carbon atoms represented by $R^{e11}$ to $R^{e14}$ is preferably from 1 to 3, more preferably 1 or 2, and still more preferably 1.

In Formula (E), the halogenated hydrocarbon-oxy group having from 1 to 6 carbon atoms represented by $R^{e11}$ to $R^{e14}$ means a hydrocarbon-oxy group having from 1 to 6 carbon atoms substituted with at least one halogen atom.

The halogen atom in the halogenated hydrocarbon-oxy group is preferably a fluorine atom, a chlorine atom, a bromine atom, or an iodine atom, more preferably a fluorine atom, a chlorine atom, or a bromine atom, still more preferably a fluorine atom or a chlorine atom, and still more preferably a fluorine atom.

In Formula (E), the halogenated hydrocarbon-oxy group having from 1 to 6 carbon atoms represented by $R^{e11}$ to $R^{e14}$ may be a linear halogenated hydrocarbon-oxy group or a halogenated hydrocarbon-oxy group having a branched and/or cyclic structure.

In Formula (E), the halogenated hydrocarbon-oxy group having from 1 to 6 carbon atoms represented by $R^{e11}$ to $R^{e14}$ is preferably a halogenated alkoxy group, a halogenated alkenyloxy group or a halogenated alkynyloxy group, more preferably a halogenated alkoxy group or a halogenated alkenyloxy group, and particularly preferably a halogenated alkoxy group.

In Formula (E), the number of carbon atoms of the halogenated hydrocarbon-oxy group having from 1 to 6 carbon atoms represented by $R^{e11}$ to $R^{e14}$ is preferably from 1 to 3, more preferably 1 or 2, and still more preferably 1.

In Formula (E), each of $R^{e11}$ to $R^{e14}$ is independently preferably a hydrogen atom, a fluorine atom, a chlorine atom, a methyl group, an ethyl group, a vinyl group, an ethynyl group, an allyl group, a trifluoromethyl group, or a methoxy group, and particularly preferably a hydrogen atom.

Specific examples of the compound represented by Formula (E) include:
sulfobenzoic anhydride,
fluorosulfobenzoic anhydride,
chlorosulfobenzoic anhydride,
difluorosulfobenzoic anhydride,
dichlorosulfobenzoic anhydride,
trifluorosulfobenzoic anhydride,
tetrafluorosulfobenzoic anhydride,
methylsulfobenzoic anhydride,
dimethylsulfobenzoic anhydride,
trimethylsulfobenzoic anhydride,
ethylsulfobenzoic anhydride,
propylsulfobenzoic anhydride,
vinylsulfobenzoic anhydride,
ethynylsulfobenzoic anhydride,
allylsulfobenzoic anhydride,
(trifluoromethyl)sulfobenzoic anhydride,
di(trifluoro)(methyl)sulfobenzoic anhydride,
(trifluoromethoxy)sulfobenzoic anhydride,
(fluoro)(methyl)sulfobenzoic anhydride,
(chloro)(methyl)sulfobenzoic anhydride,
(fluoro(methoxy)sulfobenzoic anhydride,
(chloro)(methoxy)sulfobenzoic anhydride,
di(fluoro)(methoxy)sulfobenzoic anhydride,
di(trifluoro)(vinyl)sulfobenzoic anhydride,
(fluoro)(vinyl)sulfobenzoic anhydride,
di(trifluoro)(ethynyl)sulfobenzoic anhydride, and
(fluoro)(ethynyl)sulfobenzoic anhydride.

Among these, sulfobenzoic anhydride (hereinafter, also referred to as "compound (E-1)") is particularly preferable.

In a case in which the nonaqueous electrolytic solution of the disclosure contains the compound represented by Formula (E), the content of the compound represented by Formula (E) with respect to the total amount of the nonaqueous electrolytic solution is preferably from 0.001% by mass to 10% by mass, more preferably from 0.005% by mass to 5% by mass, still more preferably from 0.01% by mass to 5% by mass, and particularly preferably from 0.1% by mass to 3% by mass.

In a case in which the nonaqueous electrolytic solution of the disclosure contains the compound represented by Formula (E), the ratio of the contained mass of the compound represented by Formula (1) with respect to the contained mass of the compound represented by Formula (E) (hereinafter, also referred to as "content mass ratio [compound represented by Formula (E)/compound represented by Formula (1)]") is preferably from 0.3 to 30 and more preferably from 1 to 20.

<Compound Represented by Formula (F)>

The nonaqueous electrolytic solution of the disclosure may contain a compound represented by the following Formula (F). The compound represented by Formula (F) is included in the sulfonate.

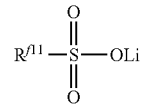

(F)

In Formula (F), $R^{f11}$ represents a fluorine atom, a hydrocarbon-oxy group having from 1 to 6 carbon atoms, or a fluorinated hydrocarbon group having from 1 to 6 carbon atoms.

In Formula (F), the hydrocarbon-oxy group having from 1 to 6 carbon atoms represented by $R^{f11}$ may be a linear hydrocarbon-oxy group or a hydrocarbon-oxy group having a branched and/or cyclic structure.

In Formula (F), the hydrocarbon-oxy group having from 1 to 6 carbon atoms represented by $R^{f11}$ is preferably an alkoxy group, an alkenyloxy group, or an alkynyloxy group, more preferably an alkoxy group or an alkenyloxy group, and particularly preferably an alkoxy group.

In Formula (F), the number of carbon atoms of the hydrocarbon-oxy group having from 1 to 6 carbon atoms represented by $R^{f11}$ is preferably from 1 to 3, more preferably 1 or 2, and still more preferably 1.

The "fluorinated hydrocarbon group having from 1 to 6 carbon atoms" represented by $R^{f11}$ has a structure in which an unsubstituted hydrocarbon group having from 1 to 6 carbon atoms is substituted with at least one fluorine atom.

Examples of the unsubstituted hydrocarbon group having from 1 to 6 carbon atoms include alkyl groups such as a methyl group, an ethyl group, a n-propyl group, an isopropyl group, a 1-ethylpropyl group, an n-butyl group, an isobutyl group, a sec-butyl group, a tert-butyl group, a 2-methylbutyl group, a 3,3-dimethylbutyl group, an n-pentyl group, an isopentyl group, a neopentyl group, a 1-methylpentyl group, an n-hexyl group, an isohexyl group, a sec-hexyl group, and a tert-hexyl group; and alkenyl groups such as a vinyl group, a 1-propenyl group, an allyl group, a 1-butenyl group, a 2-butenyl group, a 3-butenyl group, a pentenyl group, a hexenyl group, an isopropenyl group, a 2-methyl-2 propenyl group, a 1-methyl-2 propenyl group, and a 2-methyl-1 propenyl group.

Examples of the "fluorinated hydrocarbon group having from 1 to 6 carbon atoms" represented by $R^{f11}$ include fluoroalkyl groups such as a fluoromethyl group, a difluoromethyl group, a trifluoromethyl group, a 2,2,2-trifluoroethyl group, a perfluoroethyl group, a perfluoropropyl group, a perfluorobutyl group, a perfluoropentyl group, a perfluorohexyl group, a perfluoroisopropyl group, and a perfluoroisobutyl group; and fluoroalkenyl groups such as a 2-fluoroethenyl group, a 2,2-difluoroethenyl group, a 2-fluoro-2 propenyl group, a 3,3-difluoro-2 propenyl group, a 2,3-difluoro-2 propenyl group, a 3,3-difluoro-2 methyl-2 propenyl group, a 3-fluoro-2 butenyl group, a perfluorovinyl group, a perfluoropropenyl group, and a perfluorobutenyl group.

As the "fluorinated hydrocarbon group having from 1 to 6 carbon atoms" represented by $R^{f11}$, an alkyl group substituted with at least one fluorine atom or an alkenyl group substituted with at least one fluorine atom is preferable, and an alkyl group substituted with at least one fluorine atom is more preferable.

The "fluorinated hydrocarbon group having from 1 to 6 carbon atoms" represented by $R^{f11}$ may be substituted by at least one fluorine atom, and is preferably a perfluoro hydrocarbon group.

The number of carbon atoms of the "fluorinated hydrocarbon group having from 1 to 6 carbon atoms" represented by $R^{f11}$ is preferably from 1 to 3, more preferably 1 or 2, and particularly preferably 1.

As $R^{f11}$, the fluorinated hydrocarbon group having from 1 to 6 carbon atoms is preferable, a fluorinated alkyl group having from 1 to 6 carbon atoms is more preferable, a perfluoroalkyl group having from 1 to 6 carbon atoms is still more preferable, a perfluoromethyl group (another name: trifluoromethyl group) or a perfluoroethyl group (another name: pentafluoroethyl group) is still more preferable, and the perfluoromethyl group (another name: trifluoromethyl group) is particularly preferable.

Specific examples of the compound represented by Formula (F) include compounds represented by the following Formula (F-1) to the following Formula (F-3) (Hereinafter, the compounds are also referred to as compounds (F-1) to (F-3), respectively.), and the compound represented by Formula (F) is not limited to these specific examples.

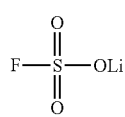
(F-1)

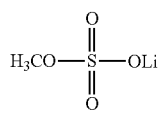
(F-2)

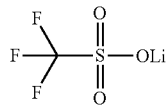
(F-3)

In a case in which the nonaqueous electrolytic solution of the disclosure contains the compound represented by Formula (F), the content of the compound represented by Formula (F) with respect to the total amount of the nonaqueous electrolytic solution is preferably from 0.001% by mass to 10% by mass, more preferably from 0.005% by mass to 5% by mass, still more preferably from 0.01% by mass to 5% by mass, and particularly preferably from 0.1% by mass to 3% by mass.

In a case in which the nonaqueous electrolytic solution of the disclosure contains the compound represented by Formula (F), the ratio of the contained mass of the compound represented by Formula (1) with respect to the contained mass of the compound represented by Formula (F) (hereinafter, also referred to as "content mass ratio [compound represented by Formula (F)/compound represented by Formula (1)]") is preferably from 0.3 to 30 and more preferably from 1 to 20.

<Other Additives>

The nonaqueous electrolytic solution of the disclosure may contain at least one kind of additive other than the compound represented by Formula (1) and the compound represented by Formula (A).

Examples of other additives include known additives that can be contained in the nonaqueous electrolytic solution.

Examples of the other additives include a carbonate compound having a carbon-carbon unsaturated bond, which is a chain carbonate such as methylvinyl carbonate, ethylvinyl carbonate, divinyl carbonate, methylpropynyl carbonate, ethylpropynyl carbonate, dipropynyl carbonate, methylphenyl carbonate, ethylphenyl carbonate, or diphenyl carbonate, or a cyclic carbonate such as vinylene carbonate, methylvinylene carbonate, 4,4-dimethylvinylene carbonate, 4,5-dimethylvinylene carbonate, vinylethylene carbonate, 4,4-divinylethylene carbonate, 4,5-divinylethylene carbonate, ethynylethylene carbonate, 4,4-diethynylethylene carbonate, 4,5-diethynylethylene carbonate, propynylethylene carbonate, 4,4-dipropynylethylene carbonate, or 4,5-dipropynylethylene carbonate; and an oxalato compound such as lithiumdifluorobis(oxalato)phosphate, lithiumtetrafluoro(oxalato)phosphate, lithiumtris(oxalato)phosphate, lithiumdifluoro(oxalato)borate, or lithiumbis(oxalato)borate.

In addition, examples of the other additives include a sulfur-based compound such as ethylene sulfite, propylene sulfite, ethylene sulfate, propylene sulfate, butene sulfate, hexene sulfate, vinylene sulfate, 3-sulfolene, divinylsulfone, dimethyl sulfate, or diethyl sulfate; a vinylboronic acid compound such as dimethyl vinylboronate, diethyl vinylboronate, dipropyl vinylboronate, or dibutyl vinylboronate;

an amide such as dimethylformamide;

a chain carbamate such as methyl-N, N-dimethylcarbamate;

a cyclic amide such as N-methylpyrrolidone;

a cyclic ureas such as N, N-dimethylimidazolidinone;

a boric acid ester such as trimethyl borate, triethyl borate, tributyl borate, trioctyl borate, or tri(trimethylsilyl) borate;

a phosphoric acid ester such as lithium difluorophosphate, lithium monofluorophosphate, trimethylphosphate, triethylphosphate, tributylphosphate, trioctylphosphate, tri(trimethylsilyl)phosphate, or triphenyl phosphate;

an ethylene glycol derivative such as ethylene glycol dimethyl ether, diethylene glycol dimethyl ether, or polyethylene glycol dimethyl ether;

an aromatic hydrocarbon such as biphenyl, fluorobiphenyl, o-terphenyl, toluene, ethylbenzene, fluorobenzene, cyclohexylbenzene, 2-fluoroanisole, or 4-fluoroanisole; and a carboxylic anhydride having a carbon-carbon unsaturated bond such as maleic anhydride or norbornene dicarboxylic anhydride.

Next, other components of the nonaqueous electrolytic solution are described. The nonaqueous electrolytic solution generally contains an electrolyte and a nonaqueous solvent.

<Electrolyte>

The electrolyte in the nonaqueous electrolytic solution of the disclosure preferably contains a lithium salt, and more preferably contains $LiPF_6$.

In a case in which the electrolyte contains $LiPF_6$, the ratio of $LiPF_6$ in the electrolyte is preferably from 10% by mass to 100% by mass, more preferably from 50% by mass to 100% by mass, and still more preferably from 70% by mass to 100% by mass.

The concentration of the electrolyte in the nonaqueous electrolytic solution of the disclosure is preferably from 0.1 mol/L to 3 mol/L, and more preferably 0.5 mol/L to 2 mol/L.

The concentration of $LiPF_6$ in the nonaqueous electrolytic solution of the disclosure is preferably from 0.1 mol/L to 3 mol/L, more preferably from 0.5 mol/L to 2 mol/L.

In a case in which the electrolyte contains $LiPF_6$, the electrolyte may contain a compound other than $LiPF_6$.

Examples of the compounds other than $LiPF_6$ include;

Tetraalkylammonium salts such as $(C_2H_5)_4NPF_6$, $(C_2H_5)_4NBF_4$, $(C_2H_5)_4NClO_4$, $(C_2H_5)_4NAsF_6$, $(C_2H_5)_4N_2SiF_6$, $(C_2H_5)_4NOSO_2C_kF_{(2k+1)}$ (k=an integer from 1 to 8), and $(C_2H_5)_4NPF_n[C_kF_{(2k+1)}]_{(6-n)}$ (n=an integer from 1 to 5, k=an integer from 1 to 8); and Lithium salts (that is, a lithium salt other than $LiPF_6$) such as $LiBF_4$, $LiClO_4$, $LiAsF_6$, $Li_2SiF_6$, LiFSI, $LiOSO_2C_kF_{(2k+1)}$ (k=an integer from 1 to 8), $LiPF_n[C_kF_{(2k+1)}]_{(6-n)}$ (n=an integer from 1 to 5, k=an integer from 1 to 8), $LiC(SO_2R^7)(SO_2R^8)(SO_2R^9)$, $LiN(SO_2OR^{10})(SO_2OR^{11})$, $LiN(SO_2R^{12})(SO_2R^{13})$ (wherein $R^7$ to $R^{13}$ may be the same as or different from each other, and each represent a fluorine atom or a perfluoroalkyl group having from 1 to 8 carbon atoms).

<Nonaqueous Solvent>

The nonaqueous solvent in the nonaqueous electrolytic solution of the disclosure may be used singly, or in combination of two or more kinds thereof.

As the nonaqueous solvent, various known solvents can be appropriately selected.

As the nonaqueous solvent, for example, a nonaqueous solvent described in paragraph 0069 to 0087 of Japanese Patent Application Laid-Open (JP-A) No. 2017-45723 can be used.

The nonaqueous solvent preferably contains a cyclic carbonate compound and a chain carbonate compound.

In this case, each of the cyclic carbonate compound and the chain carbonate compound contained in the nonaqueous solvent may be used singly, or in combination of two or more kinds thereof.

Examples of the cyclic carbonate compound include ethylene carbonate, propylene carbonate, 1,2-butylene carbonate, 2,3-butylene carbonate, 1,2-pentylene carbonate, and 2,3-pentylene carbonate.

Among them, ethylene carbonate and propylene carbonate having a high dielectric constant are suitable. In the case of the battery of the disclosure, the nonaqueous solvent more preferably contains ethylene carbonate.

Examples of the chain carbonate compound include dimethyl carbonate, methyl ethyl carbonate, diethyl carbonate, methyl propyl carbonate, methyl isopropyl carbonate, ethyl propyl carbonate, dipropyl carbonate, methyl butyl carbonate, ethyl butyl carbonate, dibutyl carbonate, methyl pentyl carbonate, ethyl pentyl carbonate, dipentyl carbonate, methyl heptyl carbonate, ethyl heptyl carbonate, diheptyl carbonate, methyl hexyl carbonate, ethyl hexyl carbonate, dihexyl carbonate, methyl octyl carbonate, ethyl octyl carbonate, and dioctyl carbonate.

Specific examples of combination of the cyclic carbonate and the chain carbonate include ethylene carbonate and dimethyl carbonate, ethylene carbonate and methyl ethyl carbonate, ethylene carbonate and diethyl carbonate, propylene carbonate and dimethyl carbonate, propylene carbonate and methyl ethyl carbonate, propylene carbonate and diethyl carbonate, ethylene carbonate and propylene carbonate and methyl ethyl carbonate, ethylene carbonate and propylene carbonate and diethyl carbonate, ethylene carbonate and dimethyl carbonate and methyl ethyl carbonate, ethylene carbonate and dimethyl carbonate and diethyl carbonate, ethylene carbonate and methyl ethyl carbonate and diethyl carbonate, ethylene carbonate and dimethyl carbonate and methyl ethyl carbonate and diethyl carbonate, ethylene carbonate and propylene carbonate and dimethyl carbonate and methyl ethyl carbonate, ethylene carbonate and propylene carbonate and dimethyl carbonate and diethyl carbonate, ethylene carbonate and propylene carbonate and methyl ethyl carbonate and diethyl carbonate, ethylene carbonate and propylene carbonate and dimethyl carbonate and methyl ethyl carbonate and diethyl carbonate.

The mixing ratio of the cyclic carbonate compound and the chain carbonate compound is, for example, from 5:95 to 80:20, preferably from 10:90 to 70:30, and still more preferably from 15:85 to 55:45 in terms of a mass ratio. By setting such a ratio, an increase in viscosity of the nonaqueous electrolytic solution can be suppressed, and the degree of dissociation of the electrolyte can be increased, so that the conductivity of the nonaqueous electrolytic solution related to charging and discharging characteristics of the battery can be increased. In addition, the solubility of the electrolyte can be further increased. Therefore, since a nonaqueous electrolytic solution having excellent electrical conductivity at room temperature or low temperature can be obtained, the load characteristics of the battery from room temperature to low temperature can be improved.

The nonaqueous solvent may contain another compound other than the cyclic carbonate compound and the chain carbonate compound.

In this case, another compound contained in the nonaqueous solvent may be used singly, or in combination of two or more kinds thereof.

Examples of another compound include a cyclic carboxylic acid ester compound (for example, γ-butyrolactone), a cyclic sulfone compound, a cyclic ether compound, a chain carboxylic acid ester compound, a chain ether compound, chain phosphoric acid ester compound, an amide compound, a chain carbamate compound, a cyclic amide compound, cyclic urea compound, a boron compound, and a polyethylene glycol derivative.

For these compounds, the description in paragraph 0069 to 0087 of JP-A No. 2017-45723 can be appropriately referred to.

The proportion of the cyclic carbonate compound and the chain carbonate compound in the nonaqueous solvent is preferably 80% by mass or more, more preferably 90% by mass or more, and still more preferably 95% by mass or more.

The proportion of the cyclic carbonate compound and the chain carbonate compound in the nonaqueous solvent may be 100% by mass.

The proportion of the nonaqueous solvent in the nonaqueous electrolytic solution is preferably 60% by mass or more, and more preferably 70% by mass or more.

The upper limit of the proportion of the nonaqueous solvent in the nonaqueous electrolytic solution depends on the content of another component (an electrolyte, an additive, etc.), and the upper limit is, for example, 99% by mass, preferably 97% by mass, and still more preferably 90% by mass.

[Lithium Secondary Battery]

A lithium secondary battery of the disclosure includes a positive electrode, a negative electrode that includes a negative electrode active material containing graphite (It is also referred to as "graphite material".), and the nonaqueous electrolytic solution of the disclosure.

<Negative Electrode>

The negative electrode contains a negative electrode active material containing graphite (It is also referred to as "graphite material".).

Examples of the graphite material include natural graphite and artificial graphite. As the artificial graphite, graphitized MCMB, graphitized MCF, or the like is used. As the graphite material, a material containing boron can also be used. As the graphite material, a material coated with a metal such as gold, platinum, silver, copper, or tin, a material coated with amorphous carbon, or mixture of amorphous carbon and graphite can also be used.

In addition, the negative electrode may contain the following negative electrode active material and negative electrode current collector in addition to the graphite material.

As the negative electrode active material in the negative electrode, at least one kind (may be used singly, or in combination of two or more kinds thereof) selected from the group consisting of metal lithium, a lithium-containing alloy, a metal or alloy capable of being alloyed with lithium, an oxide capable of being doped/dedoped with a lithium ion, a transition metal nitride capable of being doped/dedoped with a lithium ion, and a carbon material capable of being doped/dedoped with a lithium ion can be used.

Examples of the metal or alloy that can be alloyed with lithium (or a lithium ion) include silicon, silicon oxide, a silicon alloy, tin, and a tin alloy. Furthermore, lithium titanate may be used.

Among them, a carbon material capable of doping and dedoping a lithium ion is preferable. Examples of such a carbon material include carbon black, activated carbon, and an amorphous carbon material. The form of the carbon material may be any of a fibrous form, a spherical form, a potato form, and a flake form.

Specific examples of the amorphous carbon material include hard carbon, coke, a mesocarbon microbead (MCMB) calcined at 1500° C. or lower, and a mesophase pitch carbon fiber (MCF).

These carbon materials including the graphite material may be used singly or in combination of two or more kinds thereof.

The carbon material is particularly preferably a carbon material having a (002) plane spacing d (002) of 0.340 nm or less as measured by X-ray analysis. As the carbon material, graphite having a true density of 1.70 g/cm$^3$ or more or a highly crystalline carbon material having properties close thereto is also preferable. In a case in which the carbon material as described above is used, the energy density of the battery can be further increased.

The material of the negative electrode current collector in the negative electrode is not particularly limited, and a known material can be optionally used.

Specific examples of the negative electrode current collector include metal materials such as copper, nickel, stainless steel, and nickel-plated steel. Among them, copper is particularly preferable from the viewpoint of ease of processing.

<Positive Electrode>

The positive electrode may include a positive electrode active material and a positive electrode current collector.

Examples of the positive active material in the positive electrode include transition metal oxides or transition metal sulfides such as $MoS_2$, $TiS_2$, $MnO_2$, and $V_2O_5$; composite oxides composed of lithium and a transition metal, such as $LiCoO_2$, $LiMnO_2$, $LiMn_2O_4$, $LiNiO_2$, $LiNi_xCo_{(1-x)}O_2$ [0<X<1], $Li_{1+\alpha}Me_{1-\alpha}O_2$ (Me is a transition metal element including Mn, Ni and Co, $1.0 \leq (1+\alpha)/(1-\alpha) \leq 1.6$) having an $\alpha$-NaFeO$_2$-type crystal structure, $LiNi_xCo_yMn_zO_2$ [x+y+z=1, 0<x<1, 0<y<1, 0<z<1] (for example, $LiNi_{0.33}Co_{0.33}Mn_{0.33}O_2$, $LiNi_{0.5}Co_{0.2}Mn_{0.3}O_2$, $LiNi_{0.6}Co_{0.2}Mn_{0.2}O_2$, and $LiNi_{0.8}Co_{0.1}Mn_{0.1}O_2$), $LiFePO_4$, and $LiMnPO_4$; and conductive polymer materials such as polyaniline, polythiophene, polypyrrole, polyacetylene, polyacene, dimercaptothiadiazole, and a polyaniline composite.

Among them, the composite oxide composed of lithium and a transition metal is preferable as the positive electrode active material, and a compound represented by the following Formula (P1) is particularly preferable.

$$LiNi_xMn_yCo_zO_2 \qquad (P1)$$

In Formula (P1), it is preferable that x is more than 0.4 and less than 1, y is more than 0 and less than 0.6, z is more than 0 and less than 0.6, and the sum of x, y, and z is 1.

In Formula (P1), x is more preferably from 0.42 to 0.90, still more preferably from 0.45 to 0.90, and still more preferably from 0.48 to 0.90.

In Formula (P1), y is more preferably from 0.08 to 0.55, still more preferably from 0.10 to 0.50, and still more preferably from 0.10 to 0.40.

In Formula (P1), z is more preferably from 0.08 to 0.55, still more preferably from 0.10 to 0.50, and still more preferably from 0.10 to 0.30.

The compound represented by Formula (P1) is preferably $LiNi_{0.5}Mn_{0.3}Co_{0.2}O_2$, $LiNi_{0.6}Mn_{0.2}Co_{0.2}O_2$, or $LiNi_{0.8}Mn_{0.1}Co_{0.1}O_2$.

The positive electrode active material may be used singly or in combination of two or more kinds thereof. In a case in which the positive electrode active material has insufficient conductivity, the positive electrode can be configured by using the positive electrode active material together with a conductive auxiliary agent. Examples of the conductive auxiliary agent include carbon materials such as carbon black, amorphous whisker, and graphite.

The material of the positive electrode current collector in the positive electrode is not particularly limited, and a known material can be optionally used.

Specific examples of the positive electrode current collector include a metal material such as aluminum, an aluminum alloy, stainless steel, nickel, titanium, or tantalum; a carbon material such as carbon cloth and carbon paper.

<Separator>

The lithium secondary battery of the disclosure preferably includes a separator between the negative electrode and the positive electrode.

The separator is a film that electrically insulates the positive electrode from the negative electrode and allows permeation of a lithium ion, and examples thereof include a porous film and a polymer electrolyte.

As the porous film, a microporous polymer film is suitably used, and examples of the material thereof include polyolefin, polyimide, polyvinylidene fluoride, and polyester.

In particular, a porous polyolefin is preferable, and specifically, a porous polyethylene film, a porous polypropylene film, or a multilayer film of a porous polyethylene film and a polypropylene film can be exemplified. The porous polyolefin film may be coated with another resin having excellent thermal stability.

Examples of the polymer electrolyte include a polymer in which a lithium salt is dissolved, and a polymer swollen with an electrolytic solution.

The nonaqueous electrolytic solution of the disclosure may be used for the purpose of swelling a polymer to obtain a polymer electrolyte.

<Configuration of Battery>

The lithium secondary battery of the disclosure can take various known shapes, and can be formed into a cylindrical type, a coin type, a square type, a laminate type, a film type, or any other type. The basic structure of the battery is the same regardless of the shape, and a design change can be made according to the purpose.

Examples of the lithium secondary battery of the disclosure include a laminate type battery.

Figure 2:
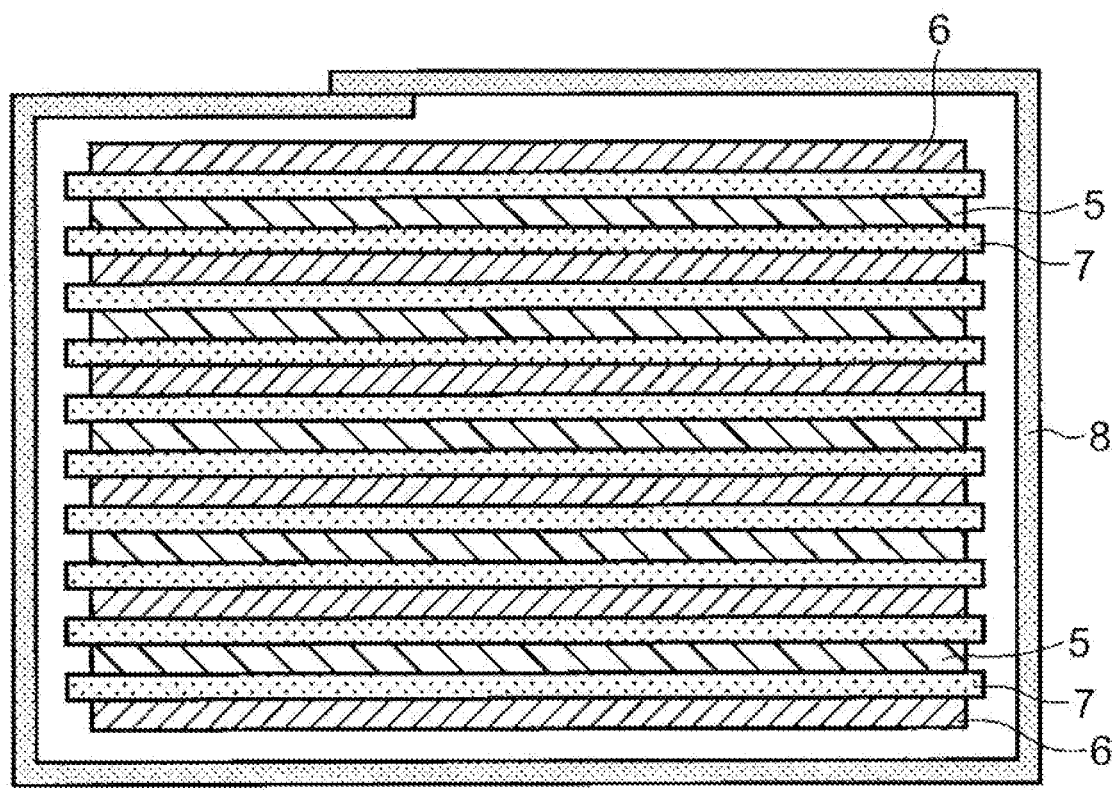
FIG. 2 is a schematic cross-sectional view in a thickness direction of a layered type electrode body housed in the laminate type battery shown in FIG. 1.

FIG. 1 is a schematic perspective view showing an example of a laminate type battery which is an example of a lithium secondary battery of the present disclosure, and FIG. 2 is a schematic cross-sectional view in a thickness direction of a layered type electrode body housed in the laminate type battery shown in FIG. 1.

The laminate type battery shown in FIG. 1 includes a laminated exterior body 1 in which a nonaqueous electrolytic solution (not shown in FIG. 1) and a layered type electrode body (not shown in FIG. 1) are housed, and the inside is sealed by sealing a peripheral edge part. As the laminated exterior body 1, for example, a laminated exterior body made of aluminum is used.

As shown in FIG. 2, the layered type electrode body housed in the laminated exterior body 1 includes a layered body formed by alternately laminating positive electrode plates 5 and negative electrode plates 6 with separators 7 interposed therebetween, and a separator 8 surrounding the periphery of the layered body. The positive electrode plate 5, the negative electrode plate 6, the separator 7, and the separator 8 are impregnated with the nonaqueous electrolytic solution of the disclosure.

Each of a plurality of the positive electrode plates 5 in the layered type electrode body is electrically connected to a positive electrode terminal 2 via a positive electrode tab (not shown), and a part of the positive electrode terminal 2 protrudes outward from a peripheral end part of the laminated exterior body 1 (FIG. 1). A part where the positive electrode terminal 2 protrudes at the peripheral end part of the laminated exterior body 1 is sealed by an insulating seal 4.

Similarly, each of a plurality of the negative electrode plates 6 in the layered type electrode body is electrically connected to a negative electrode terminal 3 via a negative electrode tab (not shown), and a part of the negative electrode terminal 3 protrudes outward from the peripheral end part of the laminated exterior body 1 (FIG. 1). A part where the negative electrode terminal 3 protrudes at the peripheral end part of the laminated exterior body 1 is sealed by the insulating seal 4.

In the laminate type battery according to the above example, the number of the positive electrode plates 5 is five, the number of the negative electrode plates 6 is six, and the positive electrode plates 5 and the negative electrode plates 6 are layered with the separator 7 interposed therebetween in such a manner that the outermost layers on both sides are the negative electrode plates 6. However, the number of positive electrode plates, the number of negative electrode plates, and the arrangement in the laminate type battery are not limited to this example, and it goes without saying that various changes may be made.

Another example of the lithium secondary battery of the disclosure includes a coin type battery.

Figure 3:
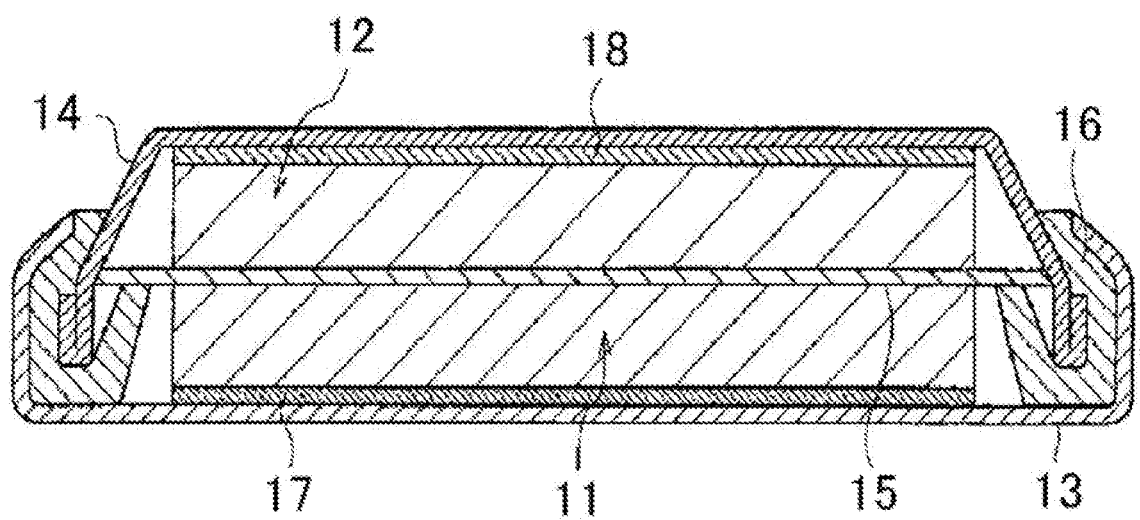
FIG. 3 is a schematic cross-sectional view showing an example of a coin type battery which is another example of the lithium secondary battery of the disclosure.

FIG. 3 is a schematic perspective view showing an example of a coin type battery which is another example of the lithium secondary battery of the disclosure.

In the coin type battery shown in FIG. 3, a disk-shaped negative electrode 12, a separator 15 into which a nonaqueous electrolytic solution is injected, a disk-shaped positive electrode 11, and if necessary, spacer plates 17 and 18 made of stainless steel or aluminum are housed between a positive electrode can 13 (hereinafter, also referred to as "battery can") and a sealing plate 14 (hereinafter, also referred to as "battery can lid") in a state of being layered in this order. The positive electrode can 13 and the sealing plate 14 are caulked and sealed with a gasket 16 interposed therebetween.

In this example, the nonaqueous electrolytic solution of the disclosure is used as the nonaqueous electrolytic solution to be injected into the separator 15.

The lithium secondary battery of the disclosure may be a lithium secondary battery obtained by charging and discharging a lithium secondary battery (lithium secondary battery before charging and discharging) containing the negative electrode, the positive electrode, and the nonaqueous electrolytic solution of the disclosure.

That is, the lithium secondary battery of the disclosure may be a lithium secondary battery (charged and discharged lithium secondary battery) produced by first producing a lithium secondary battery before charging and discharging containing the negative electrode, the positive electrode, and the nonaqueous electrolytic solution of the disclosure, and then by charging and discharging the lithium secondary battery before charging and discharging one or more times.

The application of the lithium secondary battery of the disclosure is not particularly limited, and the lithium secondary battery can be used for various known applications. For example, examples of the applications include those that can be widely used regardless of small portable devices and large devices such as notebook computers, mobile computers, mobile phones, headphone stereos, video movies, liquid crystal televisions, handy cleaners, electronic notebooks, calculators, radios, backup power supply applications, motors, automobiles, electric vehicles, motorcycles, electric motorcycles, bicycles, electric bicycles, lighting fixtures, game machines, watches, electric tools, and cameras.

EXAMPLES

Hereinafter, Examples of the present disclosure is described, but the disclosure is not limited by the following Examples.

In the following Examples, the "addition amount" means the content with respect to the total amount of the finally obtained nonaqueous electrolytic solution, the "wt %" means % by mass, the "compound of Formula (1)" means the compound represented by Formula (1), and the "compound of Formula (A)" means the compound represented by Formula (A).

Example 1

A coin type lithium secondary battery (hereinafter, also referred to as "coin type battery") having the configuration shown in FIG. 3 was produced by the following procedure.

<Production of Positive Electrode>

Ninety parts by mass of $LiNi_{0.5}Mn_{0.3}Co_{0.2}O_2$ (hereinafter, also referred to as "NMC532"), 5 parts by mass of acetylene black, and 5 parts by mass of polyvinylidene fluoride were kneaded with N-methylpyrrolidinone as a solvent to prepare a paste-like positive electrode mixture slurry.

Next, the positive electrode mixture slurry was applied to a positive electrode current collector made of a strip-shaped aluminum foil having a thickness of 20 μm, dried, and then compressed by a roll press to obtain a sheet-like positive electrode including a positive electrode current collector and a positive electrode active material layer. At this time, the positive electrode active material layer had a coating density of 22 mg/cm², and a packing density of 2.5 g/mL.

<Production of Negative Electrode>

Amorphous coated natural graphite (97 parts by mass), carboxymethyl cellulose (1 part by mass), and SBR latex (2 parts by mass) were kneaded with an aqueous solvent to prepare a paste-like negative electrode mixture slurry.

Next, the negative electrode mixture slurry was applied to a negative electrode current collector made of a strip-shaped copper foil having a thickness of 10 μm, dried, and then compressed by the roll press to obtain a sheet-shaped negative electrode including a negative electrode current collector and a negative electrode active material layer. At this time, the negative electrode active material layer had a coating density of 12 mg/cm², and a packing density of 1.5 g/mL.

<Preparation of Nonaqueous Electrolytic Solution>

As a nonaqueous solvent, ethylene carbonate (EC), dimethyl carbonate (DMC), and methyl ethyl carbonate (EMC) were mixed at a ratio of 30:35:35 (mass ratio), respectively, to obtain a mixed solvent.

$LiPF_6$ as an electrolyte was dissolved in the resulting mixed solvent so that the electrolyte concentration in the finally prepared nonaqueous electrolytic solution was 1.2 mol/liter.

For the obtained solution, as an additive, compound (1-1) (lithium trifluoroacetate) as a specific example of compound (hereinafter, also referred to as "compound of Formula (1)") represented by Formula (1) was added so that the content thereof was 0.1% by mass with respect to the total mass of the finally prepared nonaqueous electrolytic solution (that is, the addition amount is 0.1% by mass) to obtain the nonaqueous electrolytic solution.

<Production of Coin Type Battery>

The negative electrode described above was punched out so as to form a disk shape having a diameter of 14 mm, and the positive electrode described above was punched out so as to form a disk shape having a diameter of 13 mm to obtain a coin-shaped negative electrode and a coin-shaped positive electrode, respectively. A microporous polyethylene film having a thickness of 20 μm was punched out so as to form a disk shape having a diameter of 17 mm to obtain a separator.

The obtained coin-shaped negative electrode, the separator, and coin-shaped positive electrode were layered in a stainless steel battery can (2032 size) in this order, and then 20 μL of a nonaqueous electrolytic solution was injected into the battery can to impregnate the separator, the positive electrode, and the negative electrode.

Next, an aluminum plate (having a thickness of 1.2 mm, a diameter of 16 mm) and a spring were placed on the positive electrode, and the battery was sealed by caulking a battery can lid with a polypropylene gasket interposed therebetween.

As described above, a coin type battery (that is, a coin type lithium secondary battery) having a diameter of 20 mm and a height of 3.2 mm and having the configuration shown in FIG. 3 was obtained.

<Evaluation>

The obtained coin type battery was evaluated as follows.

(Initial resistance (−20° C.))

The coin type battery was repeatedly charged and discharged at a constant voltage of 4.2 V three times, and then charged up to a constant voltage of 3.9 V. Next, the charged coin type battery was cooled to −20° C. in a thermostatic chamber, discharged at a constant current of 0.2 mA at −20° C., and the potential drop was measured for 10 seconds from the start of discharge to measure the DC resistance [Ω] of the coin type battery. The obtained value was defined as an initial resistance value [Ω] (−20° C.). The initial resistance value [Ω] (−20° C.) of the coin type battery of Comparative Example 1 described later was measured in the same manner.

From these results, the initial resistance value (relative value; %) in Example 1 in a case in which the initial resistance value [Ω] (−20° C.) in Comparative Example 1 was set to 100% was determined as the "initial resistance (−20° C.) (relative value; %)" by the following Formula. The results are shown in Table 1.

Initial resistance (-20°C.)(relative value; %) =

(Initial resistance value [Ω] in Example 1(-20°C.)/initial resistance value [Ω] in Comparative Example 1(-20°C.)) × 100

Examples 2 to 7

The same procedure as in Example was carried out except that the content of the compound (1-1) in the nonaqueous electrolytic solution was changed as shown in Table 1. The results are shown in Table 1.

Examples 8 to 16

The same procedure as in Example was carried out except that a nonaqueous electrolytic solution was prepared so as to have the value shown in Table 1 by using a compound (1-2) in place of the compound (1-1) in the nonaqueous electrolytic solution. The results are shown in Table 1.

Comparative Example 1

The same procedure as in Example 1 was carried out except that the nonaqueous electrolytic solution did not contain the compound (1-1). The results are shown in Table 1.

TABLE 1

| | Negative electrode active material | Compound of Formula (1) Kind | Compound of Formula (1) Addition amount (wt %) | Battery resistance Initial resistance (−20° C.) (relative value) |
|---|---|---|---|---|
| Comparative Example 1 | Graphite | none | — | 100 |
| Example 1 | Graphite | (1-1) | 0.1 | 86 |
| Example 2 | Graphite | (1-1) | 0.2 | 83 |
| Example 3 | Graphite | (1-1) | 0.3 | 79 |
| Example 4 | Graphite | (1-1) | 0.4 | 77 |
| Example 5 | Graphite | (1-1) | 0.5 | 71 |
| Example 6 | Graphite | (1-1) | 1.0 | 71 |
| Example 7 | Graphite | (1-1) | 1.5 | 76 |
| Example 8 | Graphite | (1-2) | 0.1 | 80 |
| Example 9 | Graphite | (1-2) | 0.2 | 70 |
| Example 10 | Graphite | (1-2) | 0.3 | 77 |
| Example 11 | Graphite | (1-2) | 0.4 | 66 |
| Example 12 | Graphite | (1-2) | 0.5 | 66 |
| Example 13 | Graphite | (1-2) | 0.7 | 62 |
| Example 14 | Graphite | (1-2) | 1.0 | 62 |
| Example 15 | Graphite | (1-2) | 1.8 | 66 |
| Example 16 | Graphite | (1-2) | 2.0 | 69 |

As shown in Table 1, in Examples using the battery nonaqueous electrolytic solution for a battery containing the compound represented by Formula (1), the initial battery resistance of the battery containing the negative electrode active material containing graphite was reduced as compared with Comparative Examples using the battery nonaqueous electrolytic solution not containing the compound represented by Formula (1).

Example 101

A coin type battery was produced in the same manner as in Example 1 except that in the nonaqueous electrolytic solution, the compound (1-1) (lithium trifluoroacetate) as a specific example of the compound (hereinafter, also referred to as "compound of Formula (1)") represented by Formula (1) was added as an additive so that the content thereof was 0.5% by mass with respect to the total mass of the finally prepared nonaqueous electrolytic solution (that is, the addition amount is 0.5% by mass), and the compound (A-1) (1,3-propenesultone; hereinafter, also referred to as "PRS") as a specific example of the compound (hereinafter, also referred to as "compound of Formula (A)") represented by Formula (A) was added so that the content thereof was 0.5% by mass with respect to the total mass of the finally prepared nonaqueous electrolytic solution (that is, the addition amount is 0.5% by mass) to prepare a nonaqueous electrolytic solution.

Furthermore, regarding the initial resistance value [Ω] (−20° C.) of the obtained coin type battery, the measurement was carried out in the same manner as in Example 1, and the initial resistance value (relative value; %) in Example 101 in a case in which the initial resistance value [Ω] (−20° C.) in Comparative Example 101 described later was set to 100% was determined as the "initial resistance (−20° C.) (relative value; %)" by the following Formula. The results are shown in Table 2.

Initial resistance (−20°C.)(relative value; %) =

(Initial resistance value [Ω] in Example 101(−20°C.)/initial resistance value [Ω] in Comparative Example 101(−20°C.)) × 100

Example 102

The same procedure was carried out as in Example 101, except that the compound (1-2) was used instead of the compound (1-1) in the preparation of the nonaqueous electrolytic solution. The results are shown in Table 2.

Comparative Example 101

The same procedure as in Example 101 was carried out except that the nonaqueous electrolytic solution did not contain the compound (1-1) and the compound (A-1). The results are shown in Table 2.

Comparative Example 102

The same procedure as in Example 101 was carried out except that the nonaqueous electrolytic solution did not contain the compound (1-1). The results are shown in Table 2.

TABLE 2

| | Negative electrode active material | Compound of Formula (1) Kind | Compound of Formula (1) Addition amount (wt %) | Compound of formula (A) Kind | Compound of formula (A) Addition amount (wt %) | Battery resistance Initial resistance (−20° C.) (relative value) |
|---|---|---|---|---|---|---|
| Comparative Example 101 | Graphite | none | — | none | — | 100 |
| Comparative Example 102 | Graphite | none | — | (A-1) | 0.5 | 136 |
| Example 101 | Graphite | (1-1) | 0.5 | (A-1) | 0.5 | 91 |
| Example 102 | Graphite | (1-2) | 0.5 | (A-1) | 0.5 | 90 |

As shown in Table 2, in Examples using the battery nonaqueous electrolytic solution for a battery containing the compound represented by Formula (1), the initial battery resistance of the battery containing the negative electrode active material containing graphite was reduced as compared with Comparative Examples using the battery nonaqueous electrolytic solution not containing the compound represented by Formula (1).

Example 21

A coin type lithium secondary battery (hereinafter, also referred to as "coin type battery") having the configuration shown in FIG. 3 was produced by the following procedure.

A coin type lithium secondary battery including the following "negative electrode A" is also referred to as "battery A".

<Production of Positive Electrode>

A positive electrode was produced in the same manner as in Example 1 except that the positive electrode active material layer had a coating density of 9.5 mg/cm$^2$.

<Production of Negative Electrode A>

A negative electrode was produced in the same manner as in Example 1 except that the negative electrode active material layer had a coating density of 5.5 mg/cm$^2$.

<Preparation of Nonaqueous Electrolytic Solution>

As a nonaqueous solvent, ethylene carbonate (EC), dimethyl carbonate (DMC), and methyl ethyl carbonate (EMC) were mixed at a ratio of 30:35:35 (mass ratio), respectively, to obtain a mixed solvent.

LiPF$_6$ as an electrolyte was dissolved in the resulting mixed solvent so that the electrolyte concentration in the finally prepared nonaqueous electrolytic solution was 1.2 mol/liter.

For the obtained solution, as an additive, the compound (1-2) was added so that the content was 0.3% by mass with respect to the total mass of the finally prepared nonaqueous electrolytic solution (that is, the addition amount is 0.3% by mass) to obtain the nonaqueous electrolytic solution.

<Production of Battery A>

The negative electrode A described above was punched out so as to form a disk shape having a diameter of 14 mm, and the positive electrode described above was punched out so as to form a disk shape having a diameter of 13 mm to obtain a coin-shaped negative electrode and a coin-shaped positive electrode, respectively. A microporous polyethylene film having a thickness of 20 μm was punched out so as to form a disk shape having a diameter of 17 mm to obtain a separator.

The obtained coin-shaped negative electrode, the separator, and coin-shaped positive electrode were layered in a stainless steel battery can (2032 size) in this order, and then 20 μL of a nonaqueous electrolytic solution was injected into the battery can to impregnate the separator, the positive electrode, and the negative electrode.

Next, an aluminum plate (having a thickness of 1.2 mm, a diameter of 16 mm) and a spring were placed on the positive electrode, and the battery was sealed by caulking a battery can lid with a polypropylene gasket interposed therebetween.

As described above, a coin type battery (that is, the "battery A" which is a coin type lithium secondary battery) having a diameter of 20 mm and a height of 3.2 mm and having the configuration shown in FIG. 3 was obtained.

<Evaluation>

The obtained coin type battery (that is, the battery A) was evaluated as follows.

(Initial resistance (−20° C.))

The coin type battery was repeatedly charged and discharged at a constant voltage of 4.2 V three times, and then charged up to a constant voltage of 3.9 V. Next, the charged coin type battery was cooled to −20° C. in a thermostatic chamber, discharged at a constant current of 0.2 mA at −20° C., and the potential drop was measured for 10 seconds from the start of discharge to measure the DC resistance [Ω] of the coin type battery. The obtained value was defined as an initial resistance value [Ω] (−20° C.). The initial resistance value [Ω] (−20° C.) of the coin type battery of Comparative Example 20 described later was measured in the same manner.

From these results, the initial resistance value (relative value; %) in Example 21 in a case in which the initial resistance value [91] (−20° C.) of the coin type battery (that is, the battery A) in Comparative Example 20 was set to 100% was determined as the "initial resistance (−20° C.) (relative value; %)" by the following Formula. The results are shown in Table 3.

Initial resistance (-20°C.)(relative value; %) =

(Initial resistance value [Ω] in Example 21(-20°C.)/initial resistance value [Ω] in Comparative Example 20(-20°C.)) × 100

Examples 22 to 24

The same procedure as in Example 21 was carried out except that the kind and content of the compound in the nonaqueous electrolytic solution were changed as shown in Table 3. The results are shown in Table 3.

Comparative Example 20

Except that the nonaqueous electrolytic solution did not contain the compound (1-2), the same procedure as in Example 21 was carried out. The results are shown in Table 3.

Comparative Example 31

Next, a production method of a coin type lithium secondary battery (It is also referred to as "battery B".) including the following "negative electrode B" is described. The battery B includes the following negative electrode B.

<Production of Negative Electrode B>

Hard carbon (98 parts by mass), carboxymethyl cellulose (1 part by mass), and SBR latex (1 part by mass) were kneaded with an aqueous solvent to prepare a paste-like negative electrode mixture slurry.

Next, the negative electrode mixture slurry was applied to a negative electrode current collector made of a strip-shaped copper foil having a thickness of 10 μm, dried, and then compressed by the roll press to obtain a sheet-shaped negative electrode including a negative electrode current collector and a negative electrode active material layer. At this time, the negative electrode active material layer had a coating density of 4.6 mg/cm$^2$, and a packing density of 1 g/cm$^3$.

<Production of Battery B>

The battery B was obtained by a similar production method of the battery A in Example 21 except that the negative electrode B was used instead of the negative electrode A.

<Evaluation>

The obtained coin type battery (that is, the battery B) was evaluated as follows.

(Initial resistance (−20° C.))

The coin type battery was repeatedly charged and discharged at a constant voltage of 4.2 V three times, and then charged up to a constant voltage of 3.9 V. Next, the charged coin type battery was cooled to −20° C. in a thermostatic chamber, discharged at a constant current of 0.2 mA at −20° C., and the potential drop was measured for 10 seconds from the start of discharge to measure the DC resistance [Ω] of the coin type battery. The obtained value was defined as an initial resistance value [Ω] (−20° C.). The initial resistance value [Ω] (−20° C.) of the coin type battery of Comparative Example 30 described later was measured in the same manner.

From these results, the initial resistance value (relative value; %) in Comparative Example 31 in a case in which the initial resistance value [Ω] (−20° C.) of the coin type battery (that is, the battery B) in Comparative Example 30 was set to 100% was determined as the "initial resistance (−20° C.) (relative value; %)" by the following Formula. The results are shown in Table 3.

Initial resistance (−20°C.)(relative value; %) =

(Initial resistance value [Ω] in Comparative

Example 31(−20°C.)/initial resistance value [Ω]

in Comparative Example 30(−20°C.))×100

Comparative Examples 32 to 34

The same procedure as in Comparative Example 31 was carried out except that the kind and content of the compound in the nonaqueous electrolytic solution were changed as shown in Table 3. The results are shown in Table 3.

Furthermore, the batteries A of Examples 21 to 24 produced by combining the nonaqueous electrolytic solution for a battery containing the compound represented by Formula (1) and the negative electrode active material containing graphite had a larger reduction in initial battery resistance
than batteries B of Comparative Examples 31 to 34 produced by combining the nonaqueous electrolyte solution for a battery containing the compound represented by Formula (1) and the negative electrode active material containing hard carbon.

Example 201

A coin type battery (It is also referred to as "battery C".) was produced in the same manner as in Example 101 except for using the compound (1-2) in place of the compound (1-1) and using the compound (B-1) as the sulfur-containing compound in place of the compound (A-1) in the preparation of the nonaqueous electrolytic solution.

Furthermore, as a battery for comparison, a coin type battery (It is also referred to as "comparative battery D".) was produced in the same manner as in the battery C except that the nonaqueous electrolytic solution did not contain the compound (1-2). That is, the nonaqueous electrolytic solution in the comparative battery D does not contain the compound of Formula (1), and contains the sulfur-containing compound (that is, in Example 201, compound (B-1)) singly.

<Evaluation>

The obtained coin type batteries (that is, the battery C and the comparative battery D) were evaluated as follows.

TABLE 3

| | Compound of Formula (1) | | Battery resistance: Initial resistance (−20° C.) (relative value) | |
|---|---|---|---|---|
| | Kind | Addition amount (wt %) | Battery A (Negative electrode active material: Graphite) | Battery B (Negative electrode active material: Hard carbon) |
| Comparative Example 20 | none | — | 100 | |
| Comparative Example 30 | none | — | | 100 |
| Example 21 | (1-2) | 0.3 | 54 | |
| Comparative Example 31 | (1-2) | 0.3 | | 67 |
| Example 22 | (1-2) | 0.5 | 49 | |
| Comparative Example 32 | (1-2) | 0.5 | | 61 |
| Example 23 | (1-1) | 0.3 | 73 | |
| Comparative Example 33 | (1-1) | 0.3 | | 93 |
| Example 24 | (1-1) | 0.5 | 66 | |
| Comparative Example 34 | (1-1) | 0.5 | | 73 |

As shown in Table 3, in Examples 21 to 24 using the battery nonaqueous electrolytic solution for a battery containing the compound represented by Formula (1), the initial battery resistance of the battery containing the negative electrode active material containing graphite was reduced as compared with Comparative Example 20 using the battery nonaqueous electrolytic solution not containing the compound represented by Formula (1).

Regarding the initial resistance value [Ω] (−20° C.) of the coin type batteries (that is, the battery C and the comparative battery D), the measurement was carried out in the same manner as in Example 1, and the initial resistance value (relative value; %) in the battery C of Example 201 in a case in which the initial resistance value [Ω] (−20° C.) in the comparative battery D was set to 100% was determined as the "initial resistance (−20° C.) (relative value; %)" by the following Formula. The results are shown in Table 4.

Initial resistance (-20°C.)(relative value; %) =

(Initial resistance value [Ω] in battery $C$ of Example 201(-20°C.)/initial resistance value [Ω] in Comparative battery $D$ of Example 201(-20°C.)) × 100

Examples 202 to 211

The same procedure as in Example 201 was carried out except that the kind of the sulfur-containing compound in the nonaqueous electrolytic solution was changed to the sulfur-containing compound shown in Table 4. The results are shown in Table 4.

TABLE 4

|  | Negative electrode active material | Compound of Formula (1) | | Sulfur-containing compound | | Battery resistance |
| --- | --- | --- | --- | --- | --- | --- |
|  |  | Kind | Addition amount (wt %) | Kind | Addition amount (wt %) | Initial resistance (−20° C.) (relative value) |
| Example 201 | Graphite | (1-2) | 0.5 | Compound (B-1) | 0.5 | 95 |
| Example 202 | Graphite | (1-2) | 0.5 | Compound (B-2) | 0.5 | 86 |
| Example 203 | Graphite | (1-2) | 0.5 | Compound (C-1) | 0.5 | 92 |
| Example 204 | Graphite | (1-2) | 0.5 | Compound (C-2) | 0.5 | 88 |
| Example 205 | Graphite | (1-2) | 0.5 | Compound (D-1) | 0.5 | 76 |
| Example 206 | Graphite | (1-2) | 0.5 | Compound (D-2) | 0.5 | 85 |
| Example 207 | Graphite | (1-2) | 0.5 | Compound (E-1) | 0.5 | 82 |
| Example 208 | Graphite | (1-2) | 0.5 | Compound (F-1) | 0.5 | 94 |
| Example 209 | Graphite | (1-2) | 0.5 | Compound (F-2) | 0.5 | 95 |
| Example 210 | Graphite | (1-2) | 0.5 | Compound (F-3) | 0.5 | 78 |
| Example 211 | Graphite | (1-2) | 0.5 | Compound (C-3) | 0.5 | 82 |

As shown in Table 4, the relative values of the initial resistances (−20° C.) of Examples 201 to 211 were all less than 100.

That is, it is found that the battery of Example using the nonaqueous electrolytic solution for a battery in which the compound represented by Formula (1) and the sulfur-containing compound are used in combination has a reduced initial battery resistance as compared with the battery using the nonaqueous electrolytic solution for a battery containing the sulfur-containing compound singly.

The disclosure of Japanese Patent Application No. 2019-066772 filed on Mar. 29, 2019 is incorporated herein by reference in its entirety.

All documents, patent applications, and technical standards described in the description are incorporated herein by reference to the same extent as if each document, patent application, and technical standard were specifically and individually indicated to be incorporated by reference.

The invention claimed is:

1. A nonaqueous electrolytic solution for a battery that includes a negative electrode active material containing graphite, the nonaqueous electrolytic solution for a battery comprising:

a compound represented by the following Formula (1):

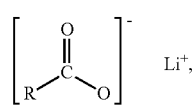
(1)

and a sulfur-containing compound, wherein, in Formula (1), R represents a fluorine atom or a fluorinated hydrocarbon group having from 1 to 6 carbon atoms, wherein a content of the sulfur-containing compound is 0.001% by mass to 5% by mass with respect to a total amount of the nonaqueous electrolytic solution, and wherein the sulfur-containing compound is selected from the group consisting of:

a disulfonyl compound, a sulfuric acid ester selected from the group consisting of compounds represented by the following Formulae (C-1) to (C-3):

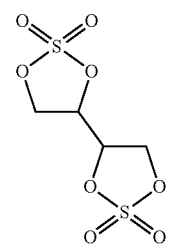
(C-1)

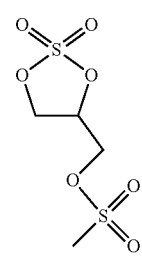
(C-2)

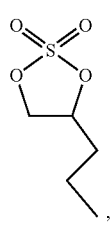
(C-3)

and a sulfobenzoic acid compound.

2. The nonaqueous electrolytic solution for a battery according to claim 1, wherein a content of the compound represented by Formula (1) is 0.001% by mass to 10% by mass with respect to a total amount of the nonaqueous electrolytic solution.

3. A lithium secondary battery comprising:

a positive electrode;

a negative electrode including a negative electrode active material containing graphite; and the nonaqueous electrolytic solution for a battery according to claim 1.

4. A lithium secondary battery obtained by charging and discharging the lithium secondary battery according to claim 3.

* * * * *